Patented Aug. 24, 1926.

1,597,233

UNITED STATES PATENT OFFICE.

RALPH V. HEUSER, OF PORTSMOUTH, NEW HAMPSHIRE, ASSIGNOR, BY MESNE ASSIGNMENTS, TO ALBERT C. BURRAGE, OF BOSTON, MASSACHUSETTS.

VULCANIZATION OF RUBBER.

No Drawing. Application filed February 27, 1923. Serial No. 621,681.

This invention relates to the vulcanization of rubber and more particularly to a novel vulcanizing process and vulcanizable compound.

It is known that certain organic substances, when added to rubber and a vulcanizing agent such as sulphur, have a catalytic action which causes the rubber and the vulcanizing agent to react much more energetically and also improve the quality of the finished product. Among the accelerators commonly employed for this purpose are the substituted guanidines, but, so far as I am aware, all of the substituted guanidines heretofore employed have comprised like groups of aryl radicals. I have now discovered that a substituted guanidine containing unlike groups of aryl radicals, as for example phenyl and tolyl, in its respective amino groups is also useful, and in fact very efficient, as a rubber accelerator, a specific instance of such a substance being phenylorthotolylguanidine of the chemical formula

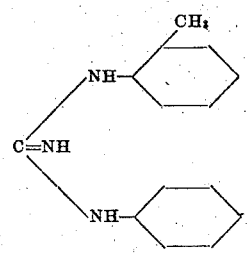

This substance is a white fluffy compound of definite chemical composition, having a melting point of approximately 130.3° C., non-hygroscopic, and readily produced from comparatively cheap raw materials available in large quantities.

This new accelerator is combined with rubber and a vulcanizing agent such as sulphur, employing a relatively small amount of accelerator, ordinarily from one to two per cent by weight of the latter, with a given weight of rubber, and the rubber is then vulcanized with the aid of heat in the usual manner. The action of this new compound is comparable to that of the best accelerators heretofore known, while it can be produced very rapidly and at low cost.

A method for the preparation of this accelerator and accelerators of which it is representative is described in my co-pending application Serial No. 621,680 filed February 27, 1923. Collateral methods for the vulcanization of rubber and for vulcanizing compositions appropriate therefor are disclosed in my co-pending application Serial No. 35,251 filed June 5, 1925 and in the application of Mr. A. C. Burrage Jr. Serial No. 75,405 filed December 14, 1925.

I claim:

1. That process of vulcanizing rubber characterized by heating rubber with a vulcanizing agent together with a di-substituted guanidine comprising aryl radicals of unlike composition in its respective amino groups.

2. That process of vulcanizing rubber characterized by heating rubber and a vulcanizing agent such as sulphur, with a di-substituted guanidine containing both phenyl and tolyl radicals.

3. That process of vulcanizing rubber characterized by heating rubber and a vulcanizing agent with phenylorthotolylguanidine.

4. In a vulcanizable compound, rubber, a vulcanizing agent, and a substituted guanidine comprising aryl radicals of unlike composition in its respective amino groups.

5. A vulcanizable compound comprising rubber, a vulcanizing agent, and a di-substituted guanidine containing phenyl and tolyl radicals.

6. A vulcanizable compound comprising rubber, a vulcanizing agent and phenyltolylguanidine.

7. A vulcanizable compound comprising rubber, a vulcanizing agent, and phenylorthotolylguanidine of the formula

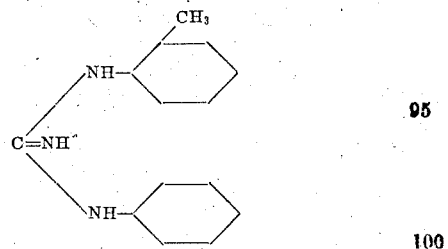

Signed by me at Boston, Massachusetts, this 20th day of February, 1923.

RALPH V. HEUSER.